(12) United States Patent
Takizawa et al.

(10) Patent No.: US 10,177,637 B2
(45) Date of Patent: Jan. 8, 2019

(54) PERMANENT MAGNET MOTOR

(71) Applicant: Mitsubishi Electric Corporation, Tokyo (JP)

(72) Inventors: Yuji Takizawa, Tokyo (JP); Shusuke Hori, Tokyo (JP); Takanori Ichikawa, Tokyo (JP); Toyoaki Udo, Tokyo (JP); Satoru Akutsu, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 206 days.

(21) Appl. No.: 15/104,298

(22) PCT Filed: Feb. 17, 2014

(86) PCT No.: PCT/JP2014/053643
§ 371 (c)(1),
(2) Date: Jun. 14, 2016

(87) PCT Pub. No.: WO2015/122015
PCT Pub. Date: Aug. 20, 2015

(65) Prior Publication Data
US 2016/0315528 A1    Oct. 27, 2016

(51) Int. Cl.
*H02K 29/03*       (2006.01)
*H02K 1/27*        (2006.01)
(Continued)

(52) U.S. Cl.
CPC .............. *H02K 29/03* (2013.01); *H02K 1/278* (2013.01); *H02K 1/2746* (2013.01); *H02K 21/16* (2013.01);
(Continued)

(58) Field of Classification Search
CPC .... H02K 1/278; H02K 2213/03; H02K 21/16; H02K 29/03
See application file for complete search history.

(56) References Cited

U.S. PATENT DOCUMENTS 4,954,736 A * 9/1990 Kawamoto ............ H02K 1/278
310/156.21
6,078,121 A * 6/2000 Poag ...................... H02K 1/278
29/596
(Continued)

FOREIGN PATENT DOCUMENTS

EP    0 780 954 A1    6/1997
JP    2000-236652 A   8/2000
(Continued)

OTHER PUBLICATIONS

Communication dated Nov. 7, 2017, from European Patent Office in counterpart application No. 14882757.9.
(Continued)

*Primary Examiner* — Dang Le
(74) *Attorney, Agent, or Firm* — Sughrue Mion, PLLC; Richard C. Turner

(57) ABSTRACT

In a permanent magnet motor, projections each include a second projecting portion and a first projecting portion separated away from a side surface of a permanent magnet. When the first projecting portion has a total length L1 in an axial line direction and a height t1, and when the second projecting portion has a total length L2 in the axial line direction and a height t2, (L1×t1)>(L2×t2) is satisfied. As a result, the permanent magnet motor capable of reducing vibration noise of the motor by reducing irregular rotation, reducing decrease in motor torque, and further reducing increase in motor physical size can be obtained.

8 Claims, 15 Drawing Sheets

(51) Int. Cl.
*H02K 21/16* (2006.01)
*H02K 11/33* (2016.01)
*H02K 3/28* (2006.01)

(52) U.S. Cl.
CPC ............... *H02K 3/28* (2013.01); *H02K 11/33* (2016.01); *H02K 2213/03* (2013.01); *H02K 2213/12* (2013.01)

(56) References Cited

U.S. PATENT DOCUMENTS

| | | | |
|---|---|---|---|
| 6,906,442 B2 * | 6/2005 | Yamaguchi | H02K 1/246 310/156.43 |
| 2002/0101126 A1 | 8/2002 | Crapo et al. | |
| 2009/0251023 A1 | 10/2009 | Nakano et al. | |
| 2011/0127870 A1 | 6/2011 | Onda et al. | |
| 2012/0326547 A1 * | 12/2012 | Suzuki | H02K 1/2746 310/156.15 |
| 2015/0333586 A1 | 11/2015 | Hirotani et al. | |
| 2015/0357892 A1 | 12/2015 | Nakano et al. | |
| 2017/0338726 A1 * | 11/2017 | Gandel | H02K 21/16 |

FOREIGN PATENT DOCUMENTS

| | | |
|---|---|---|
| JP | 2004-153913 A | 5/2004 |
| JP | 2006-353063 A | 12/2006 |
| JP | 2009-254103 A | 10/2009 |
| JP | 2011-120328 A | 6/2011 |
| JP | 2012-125076 A | 6/2012 |
| JP | 2013-009458 A | 1/2013 |
| JP | 2013-066370 A | 4/2013 |
| JP | 2013-251968 A | 12/2013 |
| WO | 2013/094075 A1 | 6/2013 |
| WO | 2014/167645 A1 | 10/2014 |
| WO | 2014/174572 A1 | 10/2014 |

OTHER PUBLICATIONS

International Search Report for PCT/JP2014/053643 dated May 20, 2014 [PCT/ISA/210].
Written Opinion for PCT/JP2014/053643 dated May 20, 2014 [PCT/ISA/237].

* cited by examiner

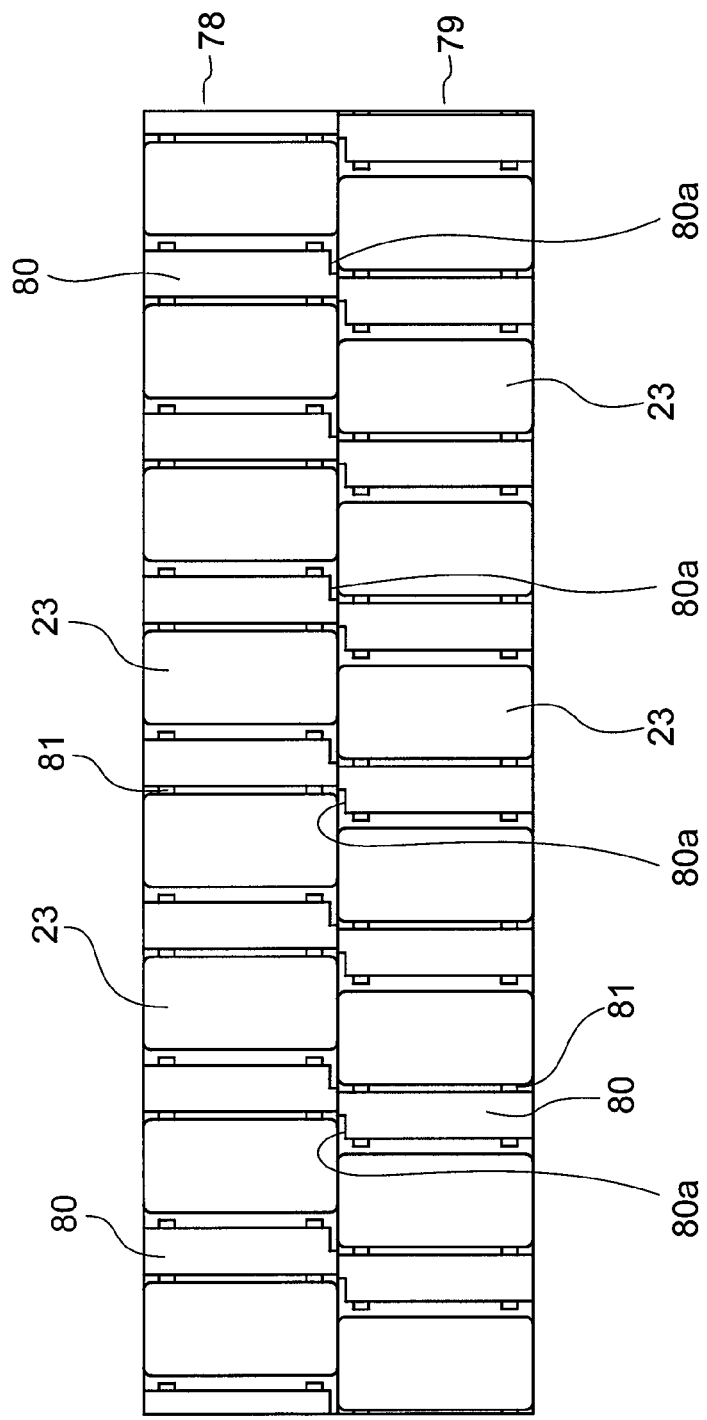

PERMANENT MAGNET MOTOR

CROSS REFERENCE TO RELATED APPLICATIONS

This application is a National Stage of International Application No. PCT/JP2014/053643 filed Feb. 17, 2014, the contents of all of which are incorporated herein by reference in their entirety.

TECHNICAL FIELD

The present invention relates to a permanent magnet motor including a rotor having permanent magnets firmly fixed onto a surface of a rotor core.

BACKGROUND ART

Hitherto, structures of permanent magnet motors have been devised. In Patent Literature 1, there is disclosed a structure configured to position permanent magnets on a rotor core.

Further, in Patent Literature 2, there is disclosed a structure having projections between permanent magnets in a rotor core so as to utilize a reluctance torque.

CITATION LIST

Patent Literature

[PTL 1] JP 2004-153913 A
[PTL 2] JP 2000-236652 A

SUMMARY OF INVENTION

Technical Problem

In the structure of Patent Literature 1, the permanent magnets can be precisely positioned on the rotor core. However, T-shaped locking pieces projecting radially outward from bonding surfaces for the permanent magnets and both side surfaces of the permanent magnets are held in abutment against each other. Therefore, in the structure including the rotor core having the large projections as in Patent Literature 2, there is generated a leakage magnetic flux corresponding to a magnetic flux of the permanent magnets, which originally flows to a stator core to generate a torque, flowing from the permanent magnets directly to the locking pieces without contributing to the torque.

Therefore, a motor torque is reduced by the amount of reduction in torque, and there is a problem in that a motor physical size is required to be increased so as to maintain a predetermined motor torque.

The present invention has been made to solve the problem described above, and has an object to provide a permanent magnet motor capable of reducing vibration noise of the motor by reducing irregular rotation, reducing decrease in motor torque, and further reducing increase in motor physical size.

Solution to Problem

According to one embodiment of the present invention, there is provided a permanent magnet motor, including:

a stator including an armature winding and a stator core having slots configured to accommodate the armature winding therein; and a rotor, which is provided on an inner side of the stator with a gap therebetween and includes a rotor core formed by sequentially laminating a plurality of thin steel plates in an axial line direction of the rotor, a plurality of permanent magnets bonded onto a plurality of bonding surfaces formed on a surface of the rotor core at intervals in a circumferential direction of the rotor core, and a shaft passing through the rotor core along a center axis line of the rotor core, the rotor core including projections each formed between the bonding surfaces adjacent to each other so as to project in a radial direction of the rotor core therefrom, each of the projections including a second projecting portion to be brought into abutment against a side surface of corresponding one of the plurality of permanent magnets in the circumferential direction and a first projecting portion separated away from the side surface of the corresponding one of the plurality of permanent magnets, in which, when the first projecting portion has a total length $L1$ in the axial line direction and a height $t1$ between an extended line from corresponding one of the plurality of bonding surfaces and a parallel line with the extended line, which intersects with a corner portion of the first projecting portion, and when the second projecting portion has a total length $L2$ in the axial line direction and a height $t2$ between the extended line and a parallel line with the extended line, which intersects with a corner portion of the second projecting portion, $(L1 \times t1) > (L2 \times t2)$ is satisfied.

Advantageous Effects of Invention

In the permanent magnet motor according to the present invention, each of the projections includes the second projecting portion to be brought into abutment against the side surface of the permanent magnet in the circumferential direction and the first projecting portion separated away from the side surface of the permanent magnet.

When the first projecting portion has the total length $L1$ in the axial line direction and the height $t1$ between the extended line from the bonding surface and the parallel line with the extended line, which intersects with the corner portion of the first projecting portion, and when the second projecting portion has the total length $L2$ in the axial line direction and the height $t2$ between the extended line and the parallel line with the extended line, which intersects with the corner portion of the second projecting portion, $(L1 \times t1) > (L2 \times t2)$ is satisfied.

As a result, the permanent magnet motor capable of reducing vibration noise of the motor by reducing irregular rotation, reducing decrease in motor torque, and further reducing increase in motor physical size can be obtained.

BRIEF DESCRIPTION OF DRAWINGS

FIG. 15 is a development view for illustrating a rotor of a permanent magnet motor according to a seventh embodiment of the present invention.

DESCRIPTION OF EMBODIMENTS

Figure 1:
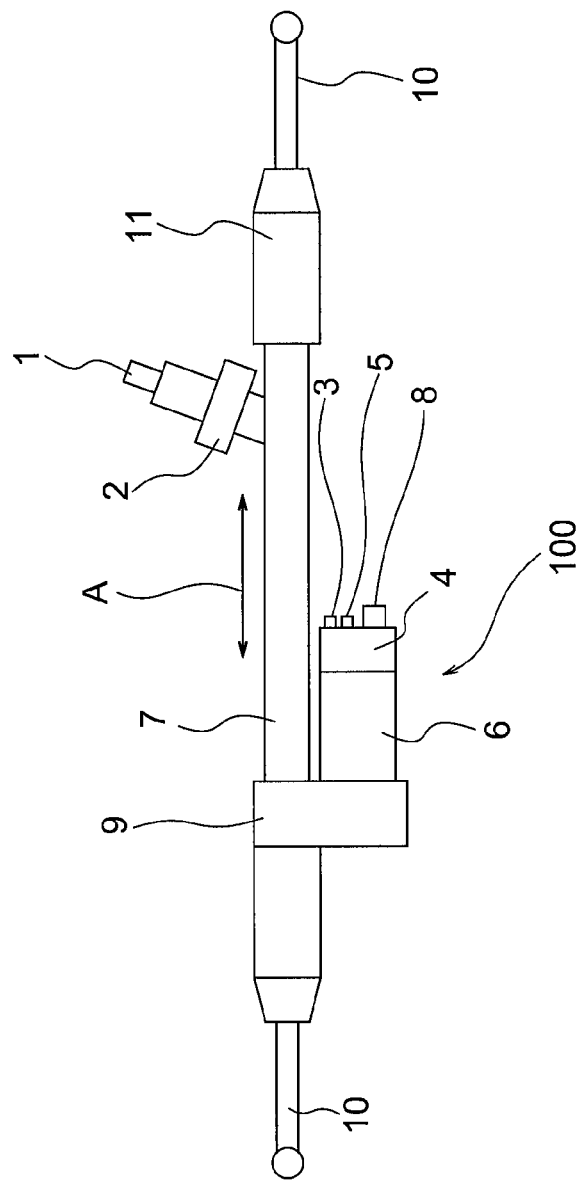
FIG. 1 is an explanatory view for illustrating an electric power steering apparatus for an automobile, in which a permanent magnet motor according to a first embodiment of the present invention is built.

A description is now given of a permanent magnet motor according to each embodiment of the present invention referring to the accompanying drawings, and throughout the drawings, like or corresponding components and parts are denoted by like reference numerals to describe those components and parts.

First Embodiment

FIG. 1 is an explanatory view for illustrating an electric power steering apparatus for an automobile, in which a permanent magnet motor 6 (hereinafter abbreviated as "motor") according to a first embodiment of the present invention is built.

A driver steers a steering wheel (not shown). A torque thereof is transmitted to a shaft 1 through a steering shaft (not shown). The torque detected by a torque sensor 2 at this time is converted into an electric signal, which is then transmitted through a cable (not shown) to an electronic control unit (ECU) 4 via a first connector 3. The ECU 4 includes a control board and inverter circuits configured to drive the motor 6.

On the other hand, information of the automobile, such as a vehicle velocity, is converted into an electric signal, which is then transmitted to the ECU 4 via a second connector 5. The ECU 4 computes a necessary assist torque from the steering torque and the information of the automobile, such as the vehicle velocity, so as to supply a current to the motor 6 through the inverters.

The motor 6 is arranged so as to be oriented in parallel to a traveling direction of a rack shaft inside a housing 7, which is indicated by the arrow A. Further, power supply to the ECU 4 is sent from a battery or an alternator via a power supply connector 8.

After being reduced in speed by a gear box 9 including a belt (not shown) and a ball screw (not shown) therein, the torque generated by the motor 6 generates a thrust force that moves the rack shaft (not shown) provided inside the housing 7 in the direction indicated by the arrow A, thereby assisting a steering force of the driver.

In this manner, a tie rod 10 is moved to turn tires. Thus, the vehicle can be turned.

As a result of the assist with the torque of the motor 6, the driver can turn the vehicle with a reduced steering force.

A rack boot 11 is provided so as to keep a foreign substance out of the electric power steering apparatus. The motor 6 and the ECU 4 are integrated to construct an electric driving device 100.

Figure 2:
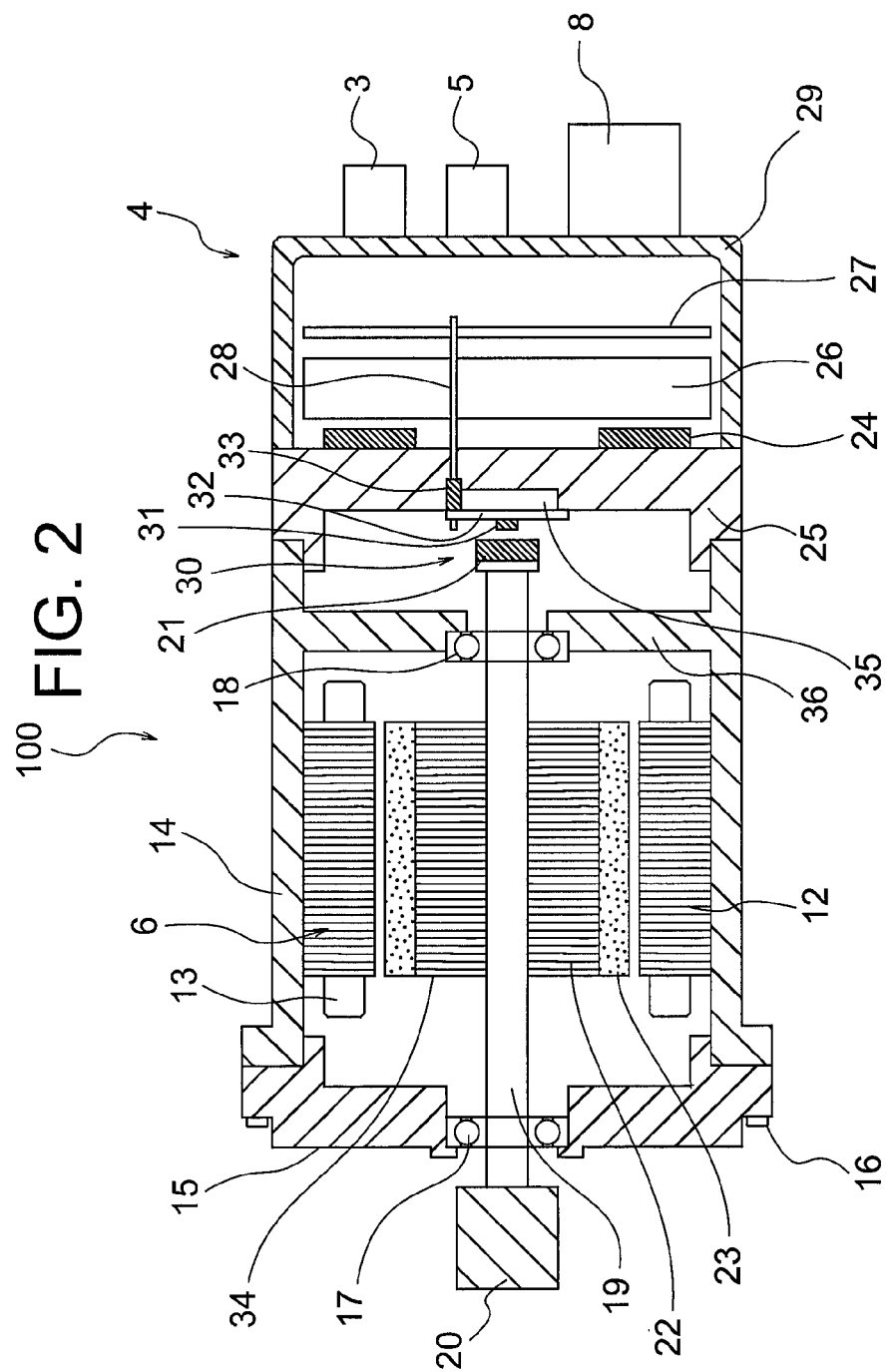
FIG. 2 is a schematic side sectional view of an electric driving device illustrated in FIG. 1.

FIG. 2 is a schematic side sectional view of the electric driving device 100.

First, the motor 6 is described.

The motor 6 includes a stator core 12 formed by laminating electromagnetic plates, an armature winding 13 accommodated inside the stator core 12, and a frame 14 configured to fix the stator core 12. Further, the frame 14 is fixed to a housing 15 located on a side of the motor 6, which is opposite to the ECU 4, with bolts 16. A first bearing 17 is provided to the housing 15. The first bearing 17 rotatably supports a shaft 19 together with a second bearing 18. The second bearing 18 is supported on a wall portion 36 provided integrally with or separately from the frame 14.

A pulley 20 is press-fitted into one end portion, that is, an output shaft side of the shaft 19. The pulley 20 functions to transmit a driving force to a belt of the electric power steering apparatus. A sensor-use permanent magnet 21 is provided to another end portion of the shaft 19. A rotor core 22 is press-fitted over the shaft 19. Permanent magnets 23 are fixed onto the rotor core 22.

The first connector 3 configured to receive a signal from the torque sensor 2, the second connector 5 configured to receive information of the automobile, such as the vehicle velocity, and the power supply connector 8 for power supply are mounted to the ECU 4. The ECU 4 includes inverter circuits configured to drive the motor 6. The inverter circuits include switching elements 24 such as MOS-FETs. For the switching elements 24, for example, a structure in which bare chips are mounted on a direct bonded copper (DBC) board, a structure in which bare chips are molded with a resin to form a module, and the like are conceivable. The switching elements 24 generate heat because a current for driving the motor 6 flows therethrough.

Therefore, the switching elements 24 have a structure to be brought into contact with a heat sink 25 through an adhesive, an insulating sheet, or the like to release heat therethrough. The inverter circuits also include smoothing capacitors, a noise-removing coil, power supply relays, and bus bars for electrical connection therebetween in addition to the switching elements 24, which are omitted in FIG. 2.

The bus bars are molded integrally with a resin to form an intermediate member 26. Further, a control board 27 is provided adjacent to the intermediate member 26. The control board 27 transmits a control signal to the switching elements 24 so as to appropriately drive the motor 6 based on information received from the first connector 3 and the second connector 5. The control signal is transmitted through a connection member 28 configured to electrically connect the control board 27 and the switching elements 24 to each other. The connection member 28 is fixed by wire bonding, press-fit, soldering, or the like.

The inverter circuits and the control board 27 described above are covered with a case 29. The case 29 may be made of a resin, a metal such as aluminum, or a combination of a resin and a metal such as aluminum. The control board 27 is arranged along a surface of the motor 6, which is perpendicular to the shaft 19.

A sensor unit 30 is arranged on the motor 6 side of the heat sink 25. The sensor unit 30 includes a magnetic sensor 31, a board 32, the connection member 28, and a supporting member 33. The board 32 on which the magnetic sensor 31 is mounted is fixed onto the heat sink 25 with screws (not shown).

The magnetic sensor 31 is arranged on the same axis as that of the sensor-use permanent magnet 21 at a position corresponding thereto, and detects a magnetic field generated by the sensor-use permanent magnet 21 to obtain an orientation thereof, thereby detecting an angle of rotation of a rotor 34 of the motor 6, which includes the rotor core 22 and the permanent magnets 23.

The ECU 4 supplies an appropriate driving current to the motor 6 in accordance with the angle of rotation.

Further, the connection member 28 is supported by the supporting member 33, and electrically connects the board 32 of the sensor unit 30 and the control board 27 to each other. The connection may be achieved by press-fit or soldering.

The connection member 28 is required to pass through the heat sink 25 and the intermediate member 26. Therefore, a hole portion (not shown) through which the connection member 28 passes is formed in each of the heat sink 25 and the intermediate member 26. Further, although not shown, the intermediate member 26 includes a guide that enables positioning of the connection member 28.

Although an example where the magnetic sensor 31 is mounted on the board different from the control board 27 is illustrated in FIG. 2, the magnetic member 31 may be mounted on the control board 27 so as to detect a magnetic flux leaking from the sensor-use permanent magnet 21 through the heat sink 25.

Further, the intermediate member 26 and the control board 27 illustrated in FIG. 2 may be arranged so as to have an interchanged positional relationship.

Although the magnetic sensor 31 is used as a rotation sensor in FIG. 2, a resolver may be used instead.

A concave portion 35 is formed on the heat sink 25, thereby increasing a distance between the magnetic sensor 31 mounted on the board 32 of the sensor unit 30 and a surface of the heat sink 25.

The heat sink 25 is fixed to the frame 14 of the motor 6 by screws, shrinkage fit, or the like. By the fixation to the frame 14 of the motor 6, heat of the heat sink 25 can be transferred to the frame of the motor 6.

Figure 3:
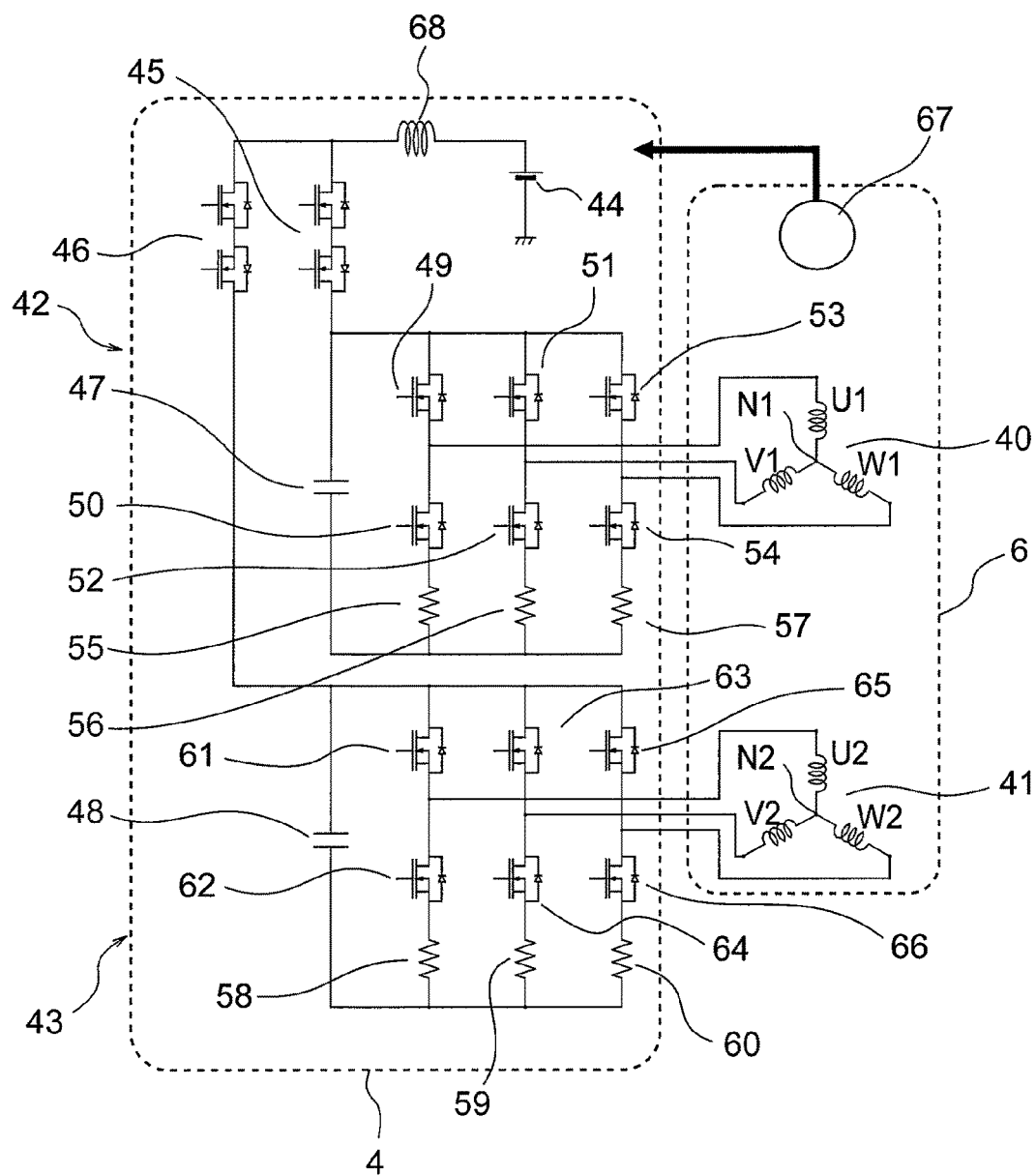
FIG. 3 is an electric circuit diagram for illustrating the electric power steering device illustrated in FIG. 1.

FIG. 3 is an electric circuit diagram of the electric power steering device according to the first embodiment in which the motor 6 is built.

The motor 6 includes a first armature winding 40 including a first U-phase winding U1, a first V-phase winding V1, and a first W-phase winding W1, and a second armature winding 41 including a second U-phase winding U2, a second V-phase winding V2, and a second W-phase winding W2. Although Y-connection is used in FIG. 3, delta-connection may be used instead. In FIG. 3, only the armature windings are illustrated, and the remaining configuration is omitted.

For the ECU 4, only a first inverter 42 and a second inverter 43 are illustrated, and the remaining configuration is omitted.

Three-phase currents are respectively supplied to the two armature windings 40 and 41 from the inverters 42 and 43. DC power is supplied to the ECU 4 from a power source 44 such as a battery. The power supply relays are connected through a noise-removing coil 68.

Although the power source 44 is illustrated in FIG. 3 as being present inside the ECU 4, power is actually supplied from the outside power source 44 such as the battery via the power supply connector 8. The power supply relays include a first power supply relay 45 and a second power supply relay 46, each including two MOS-FETs. In case of failure, the power supply relays 45 and 46 are opened so as to prevent an excessively large current from flowing.

Although the power source 44, the coil 68, and the power supply relays 45 and 46 are connected in the stated order in FIG. 3, it is apparent that the first power supply relay 45 and the second power supply relay 46 may be provided so as to be closer to the power source 44 than the coil 68.

A first capacitor 47 and a second capacitor 48 are smoothing capacitors. Although each of the smoothing capacitors includes one capacitor in FIG. 3, it is apparent that a plurality of capacitors may be connected in parallel to form each of the smoothing capacitors.

Each of the first inverter 42 and the second inverter 43 is formed of a bridge including six MOS-FETs. In the inverter 42, a first MOS-FET 49 and a second MOS-FET 50 are connected in series, a third MOS-FET 51 and a fourth MOS-FET 52 are connected in series, and a fifth MOS-FET 53 and a sixth MOS-FET 54 are connected in series. Further, the three sets of MOT-FETs 49 to 54 are connected in parallel.

Further, one shunt resistor is connected to a ground (GND) side of each of the three lower MOS-FETs, that is, the second MOS-FET 50, the fourth MOS-FET 52, and the sixth MOS-FET 54. The shunt resistors are denoted as a first shunt 55, a second shunt 56, and a third shunt 57. The shunts 55 to 57 are used to detect current values.

Although the example where the three shunts 55 to 57 are provided is described, the number of shunts may be two. Even with one shunt, the current can be detected. Therefore, it is apparent that such a configuration may be used instead.

A current is supplied to the motor 6 side through a bus bar or the like extending from a position between the first MOS-FET 49 and the second MOS-FET 50 to the U1-phase of the motor 6, through a bus bar or the like extending from a position between the third MOS-FET 51 and the fourth MOS-FET 52 to the V1-phase of the motor 6, and through a bus bar or the like extending from a position between the fifth MOS-FET 53 and the sixth MOS-FET 54 to the W1-phase of the motor 6, as illustrated in FIG. 3.

The second inverter 43 has a similar configuration. In the second inverter 43, a first MOS-FET 61 and a second MOS-FET 62 are connected in series, a third MOS-FET 63 and a fourth MOS-FET 64 are connected in series, and a fifth MOS-FET 65 and a sixth MOS-FET 66 are connected in series. Further, the three sets of MOS-FETs 61 to 66 are connected in parallel.

Further, one shunt resistor is connected to a ground (GND) side of each of the three lower MOS-FETs, that is, the second MOS-FET 62, the fourth MOS-FET 64, and the sixth MOS-FET 66. The shunt resistors are denoted as a first shunt 58, a second shunt 59, and a third shunt 60. The shunts 58 to 60 are used to detect current values.

Although the example where the three shunts 58 to 60 are provided is described, the number of shunts may be two. Even with one shunt, the current can be detected. Therefore, it is apparent that such a configuration may be used instead.

A current is supplied to the motor 6 side through a bus bar or the like extending from a position between the first MOS-FET 61 and the second MOS-FET 62 to the U2-phase of the motor 6, through a bus bar or the like extending from a position between the third MOS-FET 63 and the fourth MOS-FET 64 to the V2-phase of the motor 6, and through a bus bar or the like extending from a position between the fifth MOS-FET 65 and the sixth MOS-FET 66 to the W2-phase of the motor 6, as illustrated in FIG. 3.

Motor relays configured to electrically interrupt connection between the motor 6 and the inverters 42 and 43 in the case of failure are not illustrated in FIG. 3. In a case where the motor relays are provided, it is conceivable to provide the motor relays at neutral points N1 and N2 or between the motor and the inverters.

The two inverters 42 and 43 perform switching by transmission of signals from a control circuit (not shown) to the MOS-FETs 49 to 54 and 61 to 66 in accordance with the angle of rotation detected by a rotation-angle sensor 67 included in the motor 6, thereby supplying desired three-phase currents to the first armature winding 40 and the second armature winding 41.

As the rotation-angle sensor 67, a GMR sensor, an AMR sensor, a resolver, or the like is used.

Figure 4:
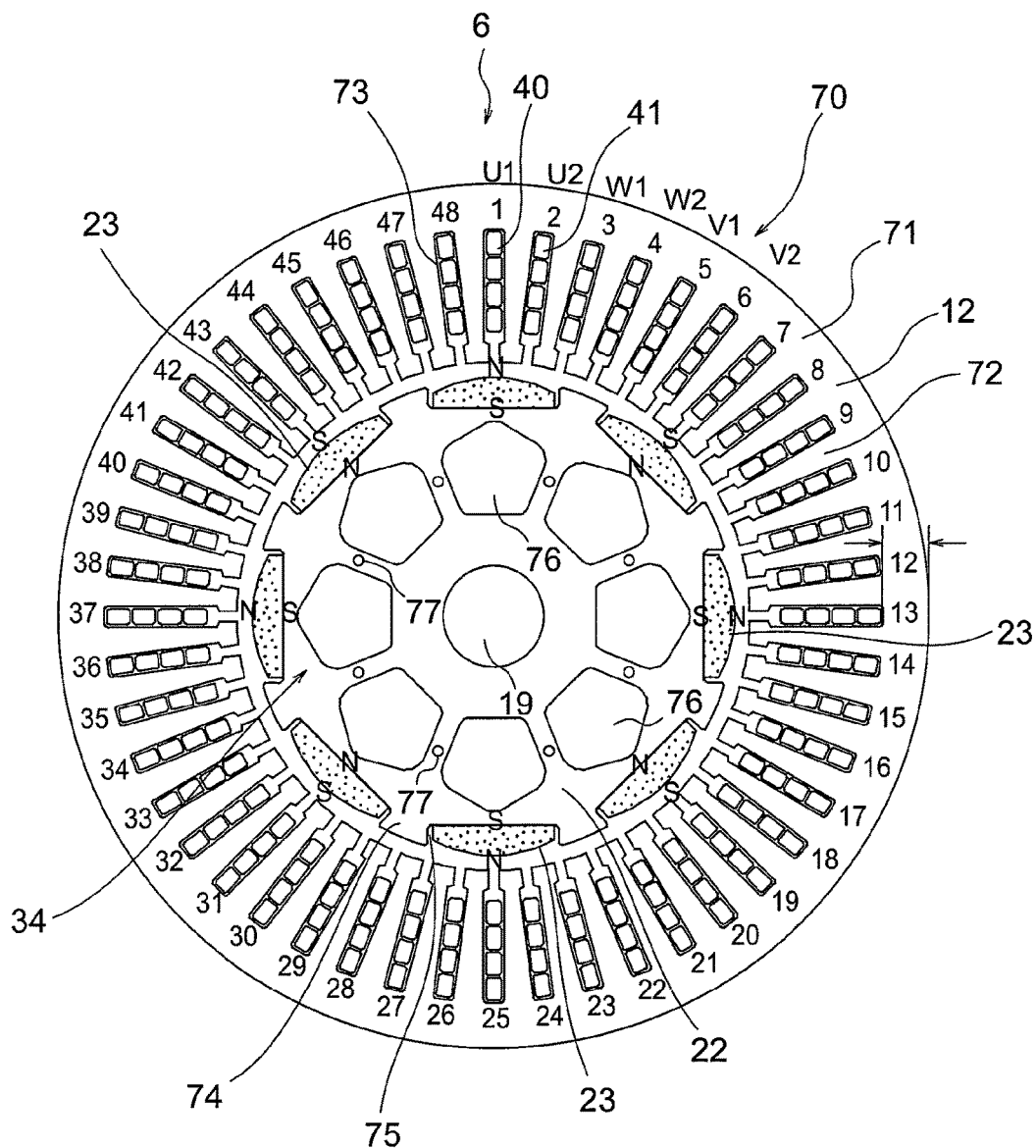
FIG. 4 is a front sectional view for illustrating a main part of the permanent magnet motor illustrated in FIG. 2.
Figure 5:
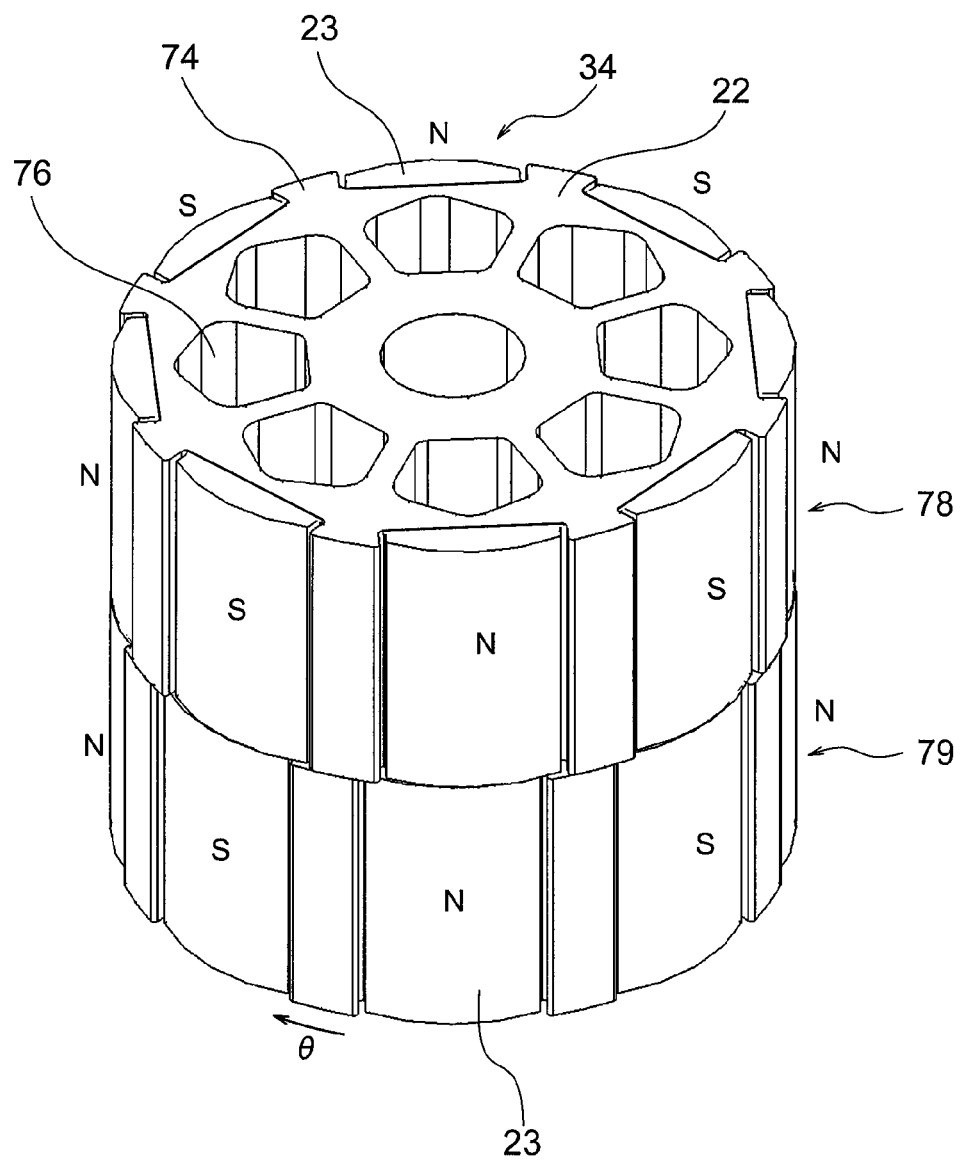
FIG. 5 is a perspective view for illustrating a rotor illustrated in FIG. 2.
Figure 6:
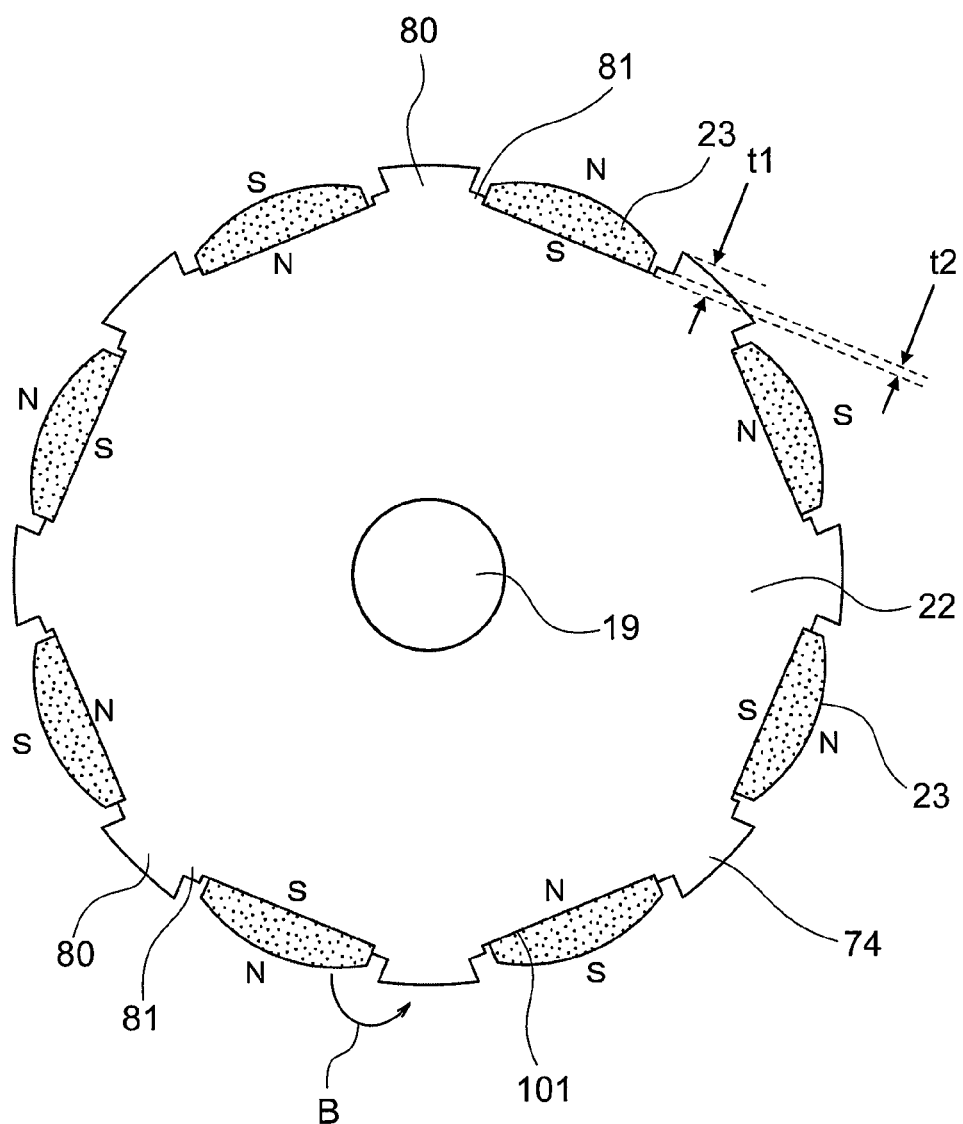
FIG. 6 is a front sectional view for illustrating the rotor illustrated in FIG. 2.
Figure 7:
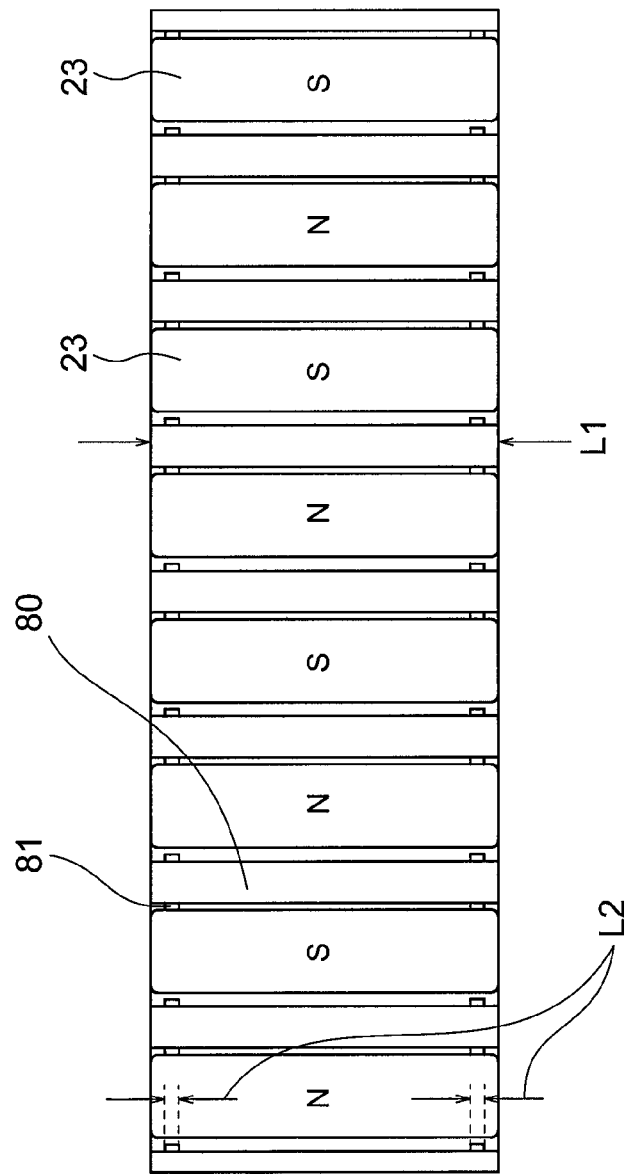
FIG. 7 is a development view for illustrating the rotor illustrated in FIG. 6.

FIG. 4 is a front sectional view of a main part of the motor 6, FIG. 5 is a perspective view of the rotor 34, FIG. 6 is a front sectional view of the rotor 34 illustrated in FIG. 4, and FIG. 7 is a development view of the rotor 34 illustrated in FIG. 6.

Projections 74 are schematically illustrated in FIG. 4 and FIG. 5, and details of the projections 74 are illustrated in FIG. 6 and FIG. 7. In FIG. 6, hole portions 76 and caulking portions 77 formed in the rotor core 22 are omitted.

A stator 70 including the first armature winding 40, the second armature winding 41, and the stator core 12 surrounds the rotor 34.

The stator core 12 includes an annular core back 71 made of magnetic members such as electromagnetic steel plates and teeth 72 extending inwardly in a circumferential direction from the core back 71. The armature windings 40 and 41 are accommodated in slots 73 formed between the adjacent teeth 72. Although not shown, insulating paper or the like is inserted between the armature windings 40 and 41 and the stator core 12 to ensure electric insulation.

A total number of the formed teeth 72 is forty-eight. Therefore, the number of the slots 73 is also forty-eight. In each of the slots 73, four coils of the armature winding 40 or 41 are accommodated.

The first armature winding 40 has three phases corresponding to the U1-phase, the V1-phase, and the W1-phase, whereas the second armature winding 41 has three phases corresponding to the U2-phase, the V2-phase, and the W2-phase.

The armature windings 40 and 41 are arranged in the order of U1, U2, W1, W2, V1, and V2 from the first slot 73 as illustrated in FIG. 4, and are similarly arranged in the order of U1, U2, W1, W2, V1, and V2 even from the seventh slot to the 48-th slot.

However, the armature windings 40 and 41 are arranged so that orientations of the currents becomes opposite to each other in the U1-phase in the first slot 73 and the U1-phase in the seventh slot 73. Specifically, each of the armature windings has a structure of distributed winding wound from the first slot 73 to the seventh slot 73. Thus, each of the armature windings 40 and 41 is arranged over six teeth 72 in total, which corresponds to an electric angle of 180 degrees and results in a short-pitch winding factor of 1. Thus, the magnetic flux generated from the permanent magnets 23 can be effectively used to obtain the motor 6 in small size with a high torque. Therefore, the amount of the permanent magnets 23 can be reduced, and hence the effect of realizing cost reduction is obtained as compared with a motor having a smaller winding factor.

The rotor 34 including the permanent magnets 23 formed on a surface of the rotor core 22 is provided inside the stator 70. Eight permanent magnets 23 are arranged in the circumferential direction to form an eight-pole structure. The adjacent permanent magnets 23 have opposite polarities. Further, the projections 74 are formed on the rotor core 22. Gaps 75 for reducing the leakage magnetic flux are formed between the projections 74 and the permanent magnets 23. The projections 74 have the effect of reducing an air gap in the motor 6, thereby increasing an inductance. In this manner, the effect of flux weakening control is more likely to be demonstrated, thereby providing the effect of enabling improvement of the torque during rotation at a high speed.

The hole portions 76 are formed equiangularly in the rotor core 22. By forming the hole portions 76, weight saving and inertia reduction can be achieved.

The rotor core 22 is formed by laminating electromagnetic steel plates or the like. The electromagnetic steel plates are connected to each other through the caulking portions 77. Through the center of the rotor core 22, the shaft 19 passes.

The rotor 34 includes a first rotor portion 78 and a second rotor portion 79 arranged in an axial direction. The second rotor portion 79 and the first rotor portion 78 are designed in the same manner and also have the same length in an axial line direction. Further, the first rotor portion 78 and the second rotor portion 79 are arranged at positions shifted from each other in a direction of the angle of rotation. An angle thereof is defined as "skew angle $\theta$".

The projection 74 of the rotor core 22 arranged between the N-pole permanent magnet 23 and the S-pole permanent magnet 23 includes a first projecting portion 80 and second projecting portions 81, as illustrated in FIG. 6.

For the first projecting portion 80, a total length in the axial line direction is defined as L1, and a height between an extended line from a bonding surface 101 and a parallel line with the extended line, which intersects with a corner portion of the first projecting portion 80, is defined as t1.

For the second projecting portion 81, a total length in the axial line direction is defined as L2, and a height between the extended line and a parallel line with the extended line, which intersects with a corner portion of the second projecting portion 81, is defined as t2.

The first projecting portion 80 and the second projecting portion 81 have a relationship: $(L1 \times t1) > (L2 \times t2)$, and the first projecting portion 80 is larger than the second projecting portion 81. When $t1 = t2$ is established, $L1 > L2$ is reliably satisfied. The second projecting portion 81 is located locally in a direction of an axial line of rotation as compared with the first projecting portion 80.

Further, when $L1 = L2$ is established, $t1 > t2$ is reliably satisfied. Therefore, the height t2 of the second projecting portion 81 is set smaller than that of the first projecting portion 80.

Each of the permanent magnets 23 is positioned by being brought into abutment against one of the pair of second projecting portions 81, and does not come into abutment against the first projecting portions 80.

In general, a cylinder made of a metal, which is formed of a thin plate such as stainless steel is placed over an outer-diameter surface of the rotor 34 in order to prevent scattering of the permanent magnets 23 due to a crack in or chipping of the permanent magnets 23. Therefore, a maximum value of the height t1 of each of the first projecting portions 80 for generating a reluctance torque is desired to be as large as an outerMOS diameter of each of the permanent magnets 23.

Next, the effects of realizing the motor 6 both with less reduction in magnetic torque and with reduction in irregular rotation caused due to a variation in bonding positions on the bonding surfaces 101 of the permanent magnets 23, which are provided by this embodiment, are described.

In the motor 6 that utilizes not only the magnet torque but also the reluctance torque generated by the projections 74 of the rotor core 22, the reluctance torque can be more utilized as a size (L1×t1) of each of the first projecting portions 80 becomes larger.

However, when the permanent magnets 23 cannot be precisely fixed on the rotor core 22 with smaller positional variations on the bonding surfaces 101, the irregular rotation is caused thereby. In electric power steering for a vehicle, steering feel is degraded thereby. Besides, in a device to be mounted such as an electronic component, an adverse effect of causing yield reduction or the like is produced.

In view of this, the permanent magnets 23 only need to be fixed so as to be located close to one side of the projections 74 formed on the rotor core 22. However, as the permanent magnets 23 and the projections 74 are located closer to each other, a part of the magnetic flux of the permanent magnets 23, which originally flows to the stator core 12 to be a magnet torque, flows as a leakage magnetic flux to the projections 74 as indicated by the arrow B in FIG. 6. Thus, there arises a problem in that the magnetic torque is lowered correspondingly.

In particular, in the permanent magnet motor having the large projections 74, which utilizes not only the magnet torque but also the reluctance torque, the leakage magnetic flux increases because the projections 74 are large in size. As a result, the magnetic torque is liable to be lowered.

Specifically, when gaps are provided between the projections 74 and the permanent magnets 23, the reduction in magnet torque can be decreased. However, it becomes difficult to precisely position the permanent magnets 23 on the bonding surfaces 101. Thus, variations are generated in the bonding positions, resulting in increased irregular rotation.

On the other hand, when the projections 74 and the permanent magnets 23 are brought into abutment against each other, the irregular rotation can be reduced. However, the leakage magnetic flux from the permanent magnets 23 to the projections 74 increases, resulting in the lowered magnet torque.

Therefore, in this embodiment, each of the projections 74 is formed to have a structure including the first projecting portion 80 having the height t1 for utilizing the reluctance torque and the second projecting portion 81 to be brought into abutment against the permanent magnet 23 to precisely position the permanent magnet 23 on the bonding surface 101, the second projecting portion 81 having the height t2 smaller than the height t1. With this structure, remarkable effects of realizing the motor 6 both with the less reduction in magnet torque and with the reduced irregular rotation can be obtained.

As a result, problems of increase in motor volume and motor weight, and increase in material cost due to increase in the amount of use of the permanent magnets are solved, considering that the motor physical size has hitherto been increased so as to compensate for the reduction in magnet torque.

In particular, in the electric power steering apparatus for a vehicle, the reduction in volume of the motor 6 has the effect of realizing improvement of ease of layout through reduction in geometrical positional interference with other in-vehicle devices, the reduction in weight of the motor 6 has the effect of realizing improvement of fuel efficiency through reduction in vehicle weight, and the reduction in the amount of use of the permanent magnets 23 has the effect of realizing improvement of costs through the reduction in material cost.

Although the skew is described in this embodiment, it is apparent that the same effects are obtained regardless of the presence or absence of the skew.

Figure 8:
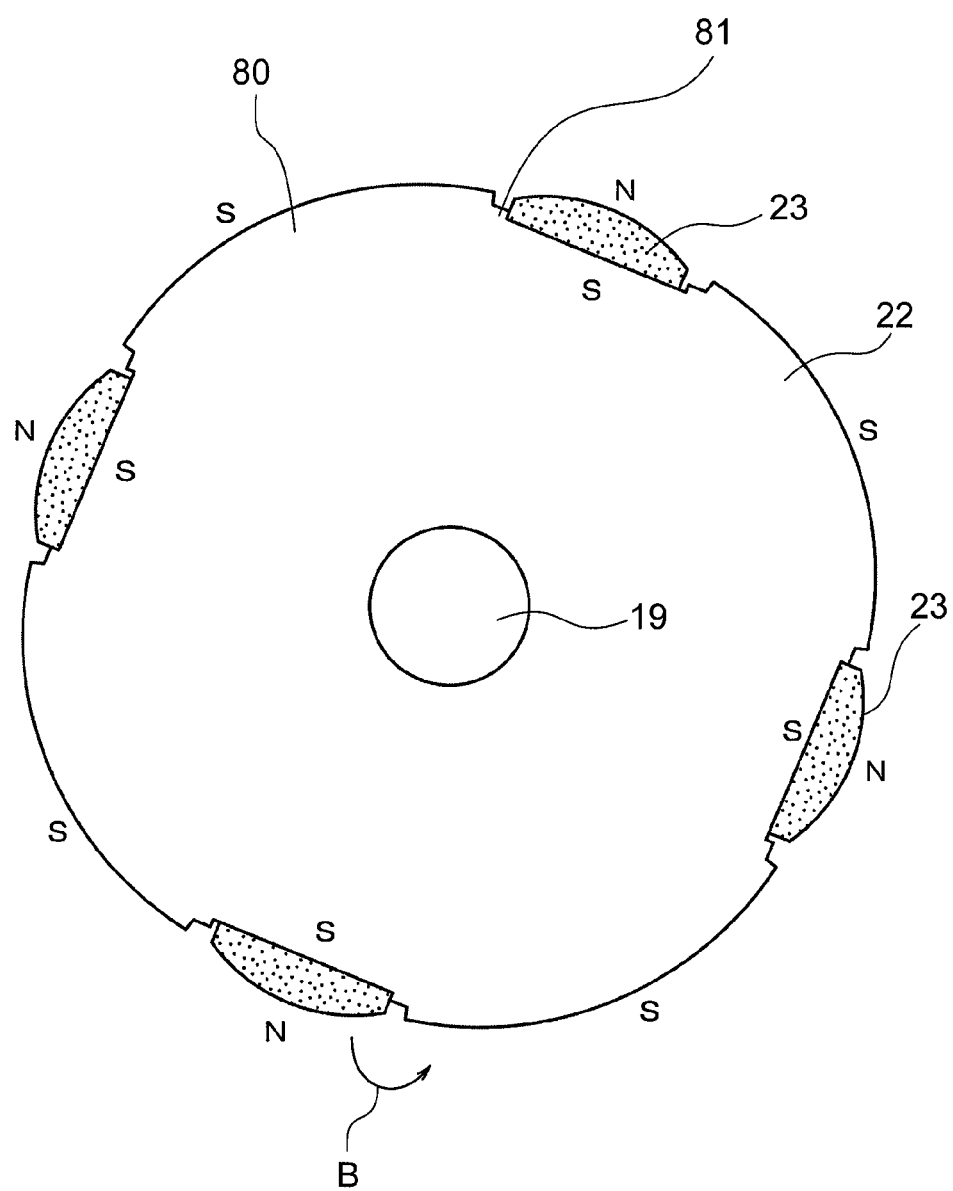
FIG. 8 is a front sectional view for illustrating a modified example of the rotor illustrated in FIG. 7.

Although the double three-phase windings are described in this embodiment, it is apparent that the same effects are obtained regardless of the number of phases and the number of inverters. Although the motor in which the permanent magnets 23 adjacent to each other in the circumferential direction have different polarities is described in this embodiment, it is apparent that the same effects are obtained even with a consequent-pole type including the permanent magnets 23 uniquely having the N-pole or the S-pole and the rotor core 22 having the opposite polarity as illustrated in FIG. 8.

Figure 9:
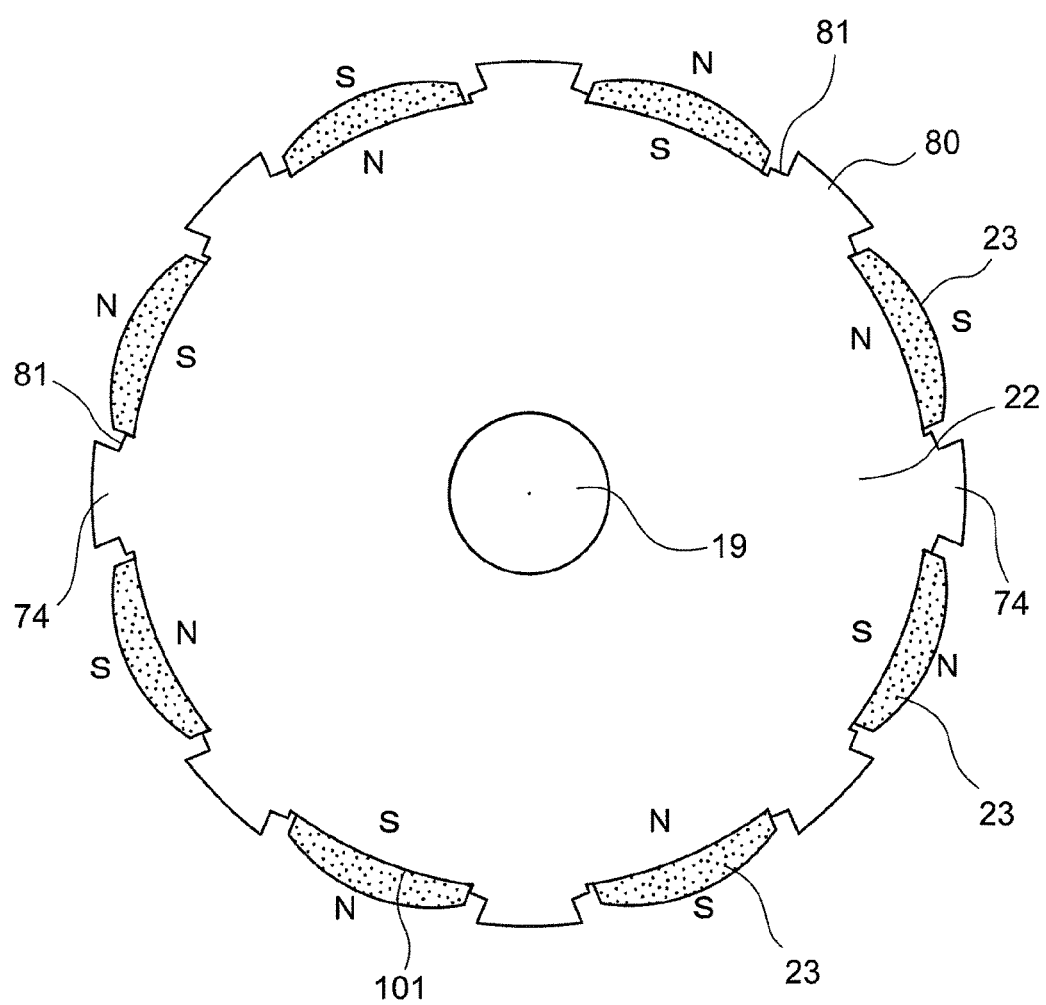
FIG. 9 is a front sectional view for illustrating another modified example of the rotor illustrated in FIG. 7.

The motor 6 including the D-shaped permanent magnets 23 with the bonding surfaces 101 being flat surfaces is described in this embodiment. However, even when the motor includes roof-tile shaped permanent magnets 23 with the bonding surfaces 101 being curved surfaces as illustrated in FIG. 9, the following remarkable effects can be particularly obtained by forming the projections 74 each including the first projecting portion 80 and the second projecting portion 81 between the adjacent bonding surfaces 101 of the rotor core 22.

Specifically, in the case with the roof-tile shaped permanent magnets 23, the bonding surfaces 101 also have curved surfaces. Therefore, as compared with the D-shaped permanent magnets 23, it becomes more difficult to precisely bond the plurality of permanent magnets 23 without positional misalignment in the circumferential direction. Accordingly, the effect of reducing the irregular rotation is particularly remarkable.

Second Embodiment

Figure 10:
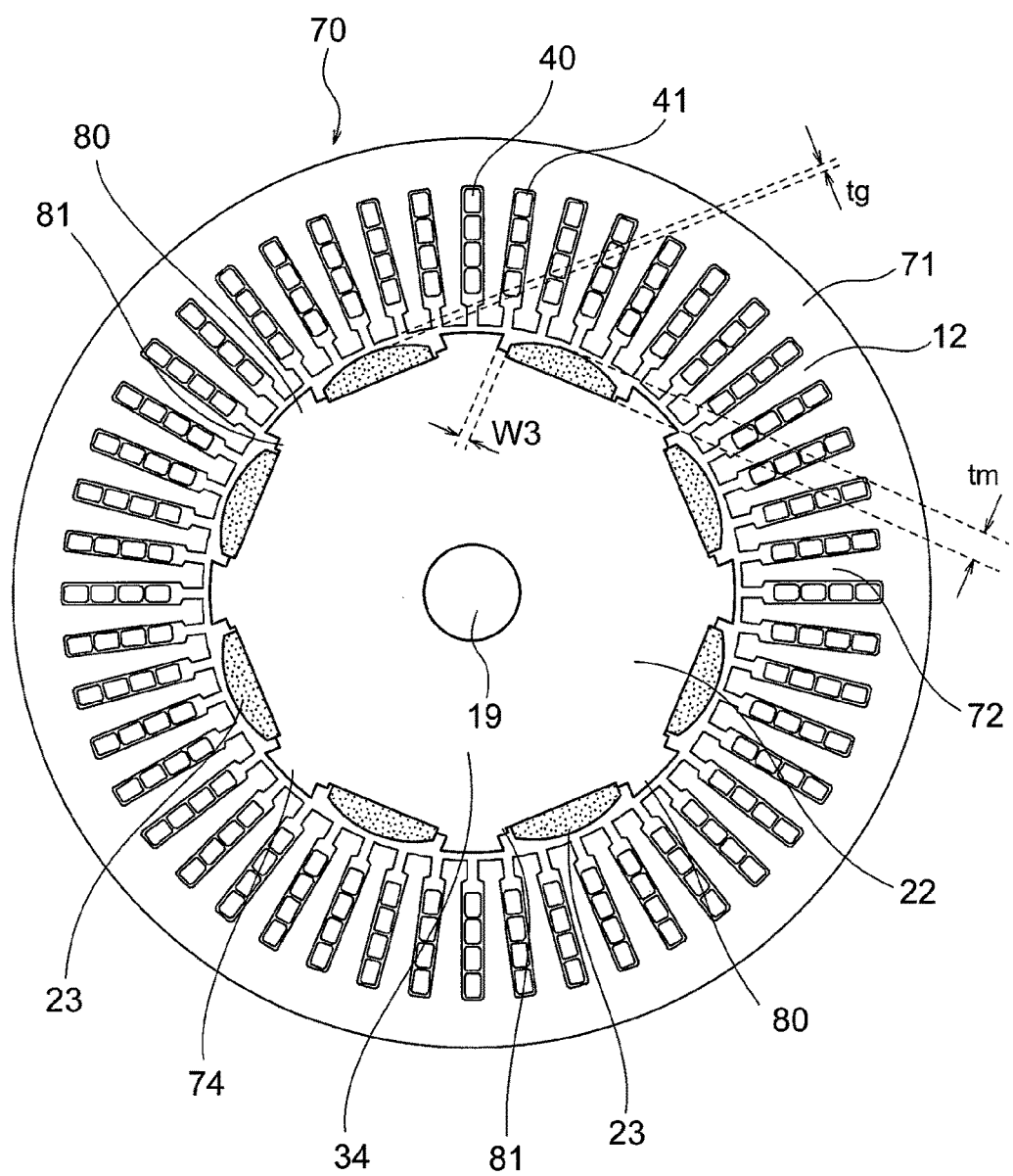
FIG. 10 is a front sectional view for illustrating a main part of a permanent magnet motor according to a second embodiment of the present invention.

FIG. 10 is a front sectional view of a main part of the motor 6 according to a second embodiment of the present invention.

In this embodiment, when a width of the second projecting portion 81 to be brought into abutment against the permanent magnet 23 at one pole is defined as W3, a gap distance between the permanent magnets 23 and the stator 70 is defined as tg, and a thickness at a center in the circumferential direction of an arc-like outer circumferential side of each of the permanent magnets 23 is defined as tm, a relationship: tg<(3×W3)<tm is satisfied.

In this embodiment, a distance to the stator 70 is shorter than a distance to the first projecting portion 80 in terms of the magnetic flux of the permanent magnets 23. Therefore, the leakage magnetic flux circulating in the rotor 34 without flowing to the stator 70 can be reduced.

Third Embodiment

Figure 11:
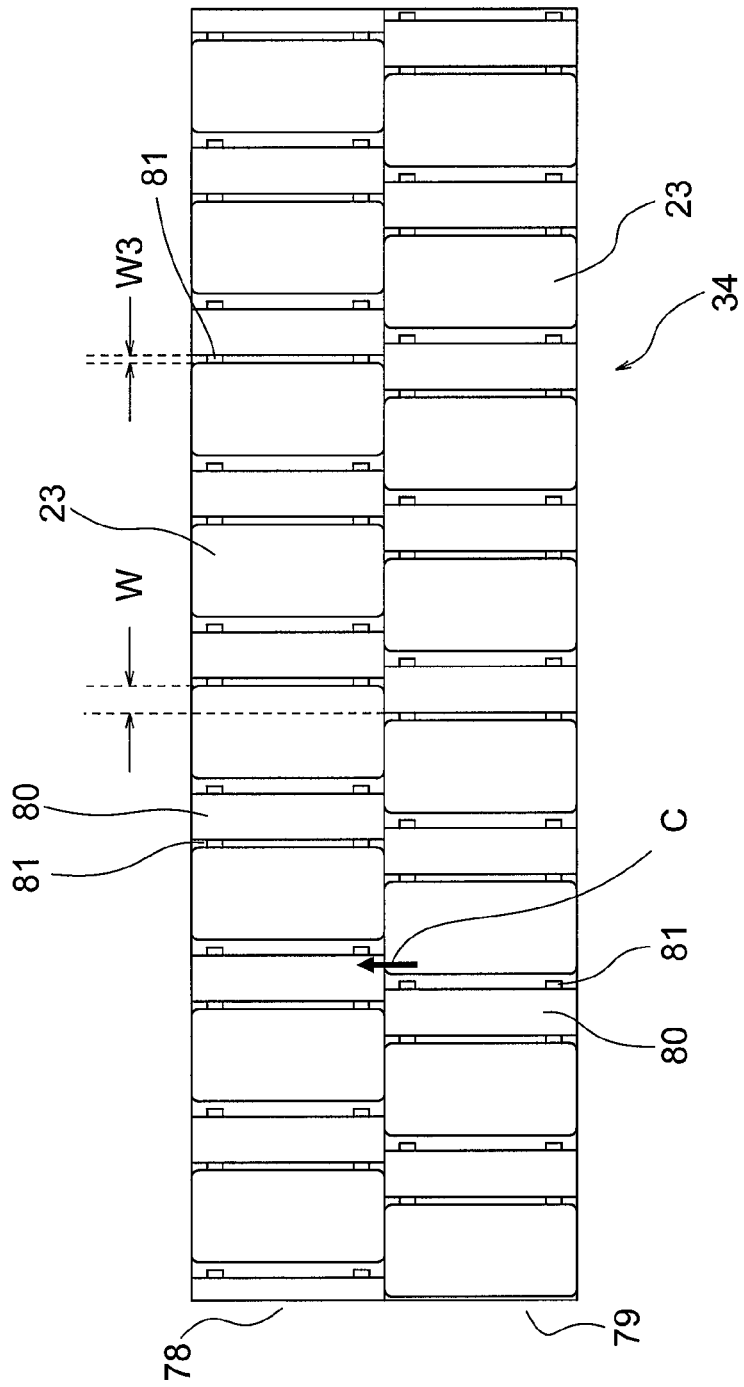
FIG. 11 is a development view for illustrating a rotor of a permanent magnet motor according to a third embodiment of the present invention.

FIG. 11 is a development view for illustrating the rotor 34 of the motor 6 according to a third embodiment of the present invention.

In this embodiment, when the width of the second projecting portion 81 to be brought into abutment against the permanent magnet 23 at one pole is defined as W3 and a width of offset between the first rotor portion 78 and the second rotor portion 79 by skewing is defined as W, a relationship: W3<W is satisfied.

The remaining configuration is the same as that of the motor 6 according to the first embodiment.

When the skew angle θ is large, specifically, the offset width W is large, an overlapping portion ΔW between the permanent magnet 23 and the first projecting portion 80 through a skewed portion therebetween is: ΔW=(W−W3)=0.

In this case, in terms of the magnetic flux of the permanent magnets 23, not only the leakage magnetic flux in the circumferential direction, which flows to the first projecting portions 80 of the same second rotor portion 79 onto which the permanent magnets 23 are fixed, but also the leakage magnetic flux (indicated by the arrow C) in the axial line direction, which flows to the first projecting portions 80 of the first rotor portion 78, increases.

The skew is determined so as to cancel the irregular rotation. Therefore, it is effective to set ΔW to a positive value close to zero so as to decrease the reduction in magnet torque. For such setting, it is understood that W3 needs to be increased.

Fourth Embodiment

Figure 12:
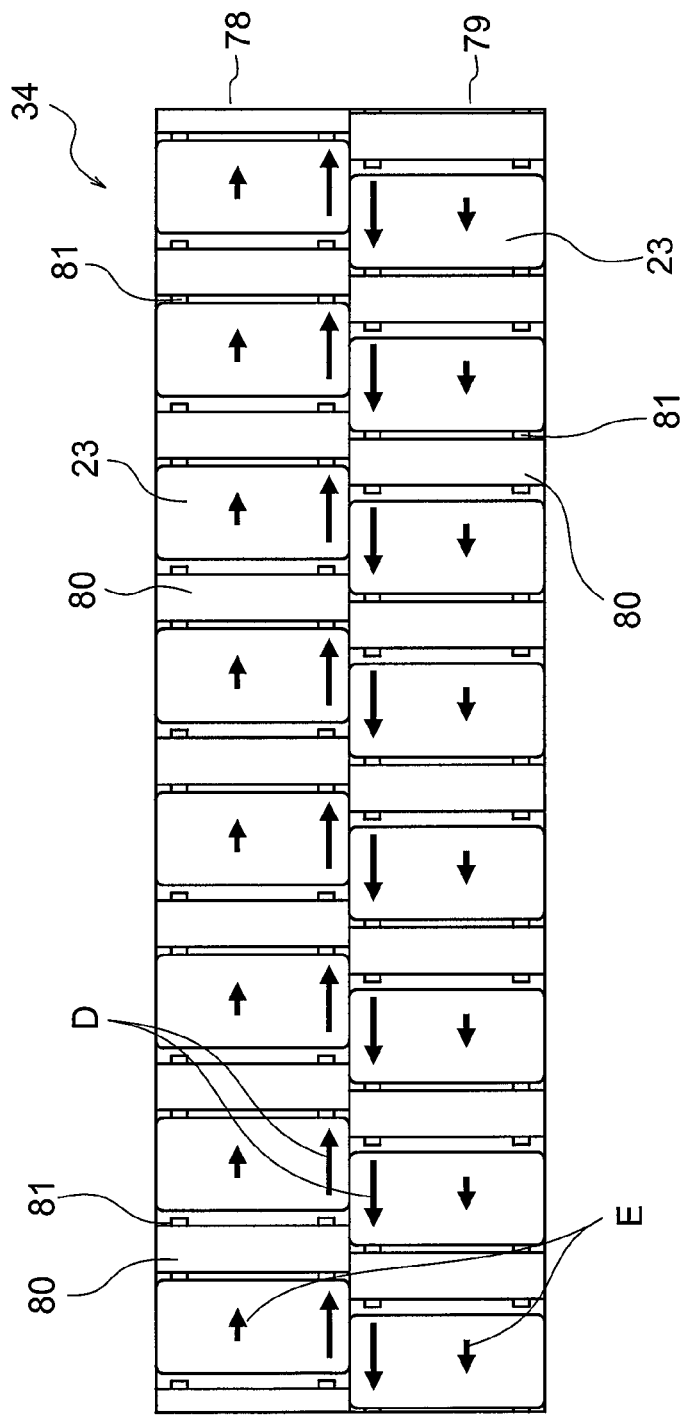
FIG. 12 is a development view for illustrating a rotor of a permanent magnet motor according to a fourth embodiment of the present invention.

FIG. 12 is a development view for illustrating the rotor 34 of the motor 6 according to a fourth embodiment of the present invention.

In this embodiment, the adjacent permanent magnets 23 having the same polarity in each of the adjacent rotor portions 78 and 79 are held in abutment against the second projecting portions 81 in an orientation of a repulsive force in the circumferential direction.

The remaining configuration is the same as that of the motor 6 according to the first embodiment.

In this embodiment, the permanent magnets 23 of the first rotor portion 78 and those of the second rotor portion 79, which have the same polarity, are skewed. Therefore, an orientation of the arrow D in which a repulsive force acts in the circumferential direction and an orientation of the arrow E in which the permanent magnets 23 are brought into abutment against the second projecting portions 81 of the projections 74 by using a tool are the same.

Therefore, when the magnetized permanent magnets 23 are brought into abutment against the second projecting portions 81 so as to be bonded and fixed onto the rotor core 22 through an adhesive or the like, the orientations of the arrows D in which the permanent magnets 23 repel in the circumferential direction are naturally the same as the directions in which the permanent magnets 23 are brought into abutment against the second projecting portions 81. Therefore, the bonded positions of the permanent magnets 23 are not shifted while the adhesive or the like is being cured.

Further, when the unmagnetized permanent magnets 23 are brought into abutment against the second projecting portions 81 so as to be bonded and fixed onto the rotor core 22 through an adhesive or the like, the orientations of the arrows D in which the permanent magnets 23 repel in the circumferential direction are naturally the same as the directions in which the permanent magnets 23 are brought into abutment against the second projecting portions 81. Therefore, even when a fixing force of the adhesive is lowered due to increase in temperature or deterioration over time, the permanent magnets 23 are naturally brought into abutment against the second projecting portions 81. Therefore, the bonded positions of the permanent magnets 23 are not shifted.

Specifically, even when the fixing force of the adhesive or the like is small, a characteristic effect of maintaining the precise positioning of the permanent magnets 23 is provided.

Fifth Embodiment

Figure 13:
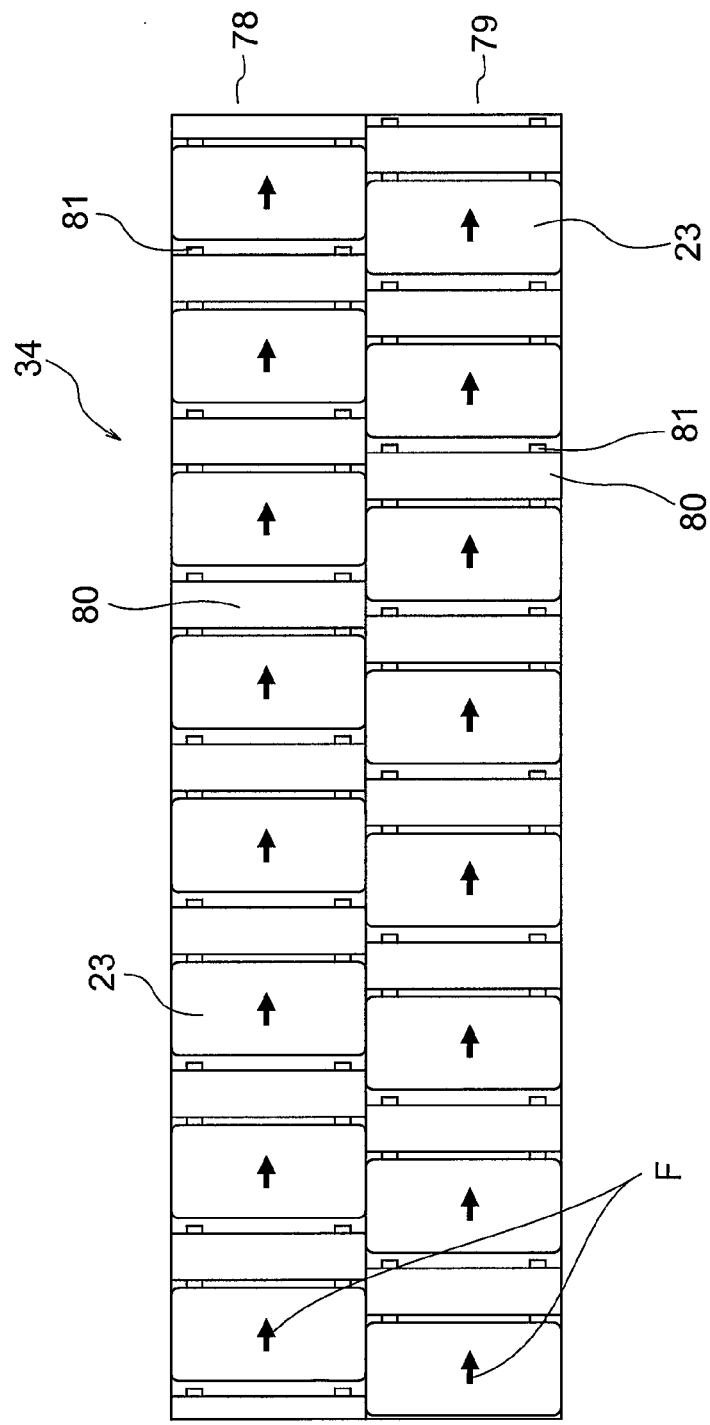
FIG. 13 is a development view for illustrating a rotor of a permanent magnet motor according to a fifth embodiment of the present invention.

FIG. 13 is a development view for illustrating the rotor 34 of the motor 6 according to a fifth embodiment of the present invention.

In this embodiment, for the permanent magnets 23 having the same polarity provided on the rotor portions 78 and 79 adjacent to each other, the second projecting portions 81 against which side surfaces of the permanent magnets 23 are brought into abutment are provided on the same side in the circumferential direction for each rotor portion, as indicated by the arrow F.

The remaining configuration is the same as that of the motor 6 according to the first embodiment.

In this embodiment, when the permanent magnets 23 are bonded onto the rotor core 22 by using a tool, the orientation F in the circumferential direction in which the abutment is made is same for the first rotor portion 78 and the second rotor portion 79. Therefore, the bonding can be performed while rotating the tool or the rotor 34 in one direction. Therefore, the effects of simplifying the tool and shortening bonding time are provided.

In particular, when the height of the first projecting portions 80 is as large as the height of the permanent magnets 23, the bonding is performed while preventing collision with the first projecting portions 80 for each pole, and thus an operation of avoiding movement of the first projecting portions 80 in an outer diameter direction is additionally performed. Therefore, special effects are provided in this case in view of the simplification of the tool and the reduction in bonding time.

Sixth Embodiment

Figure 14:
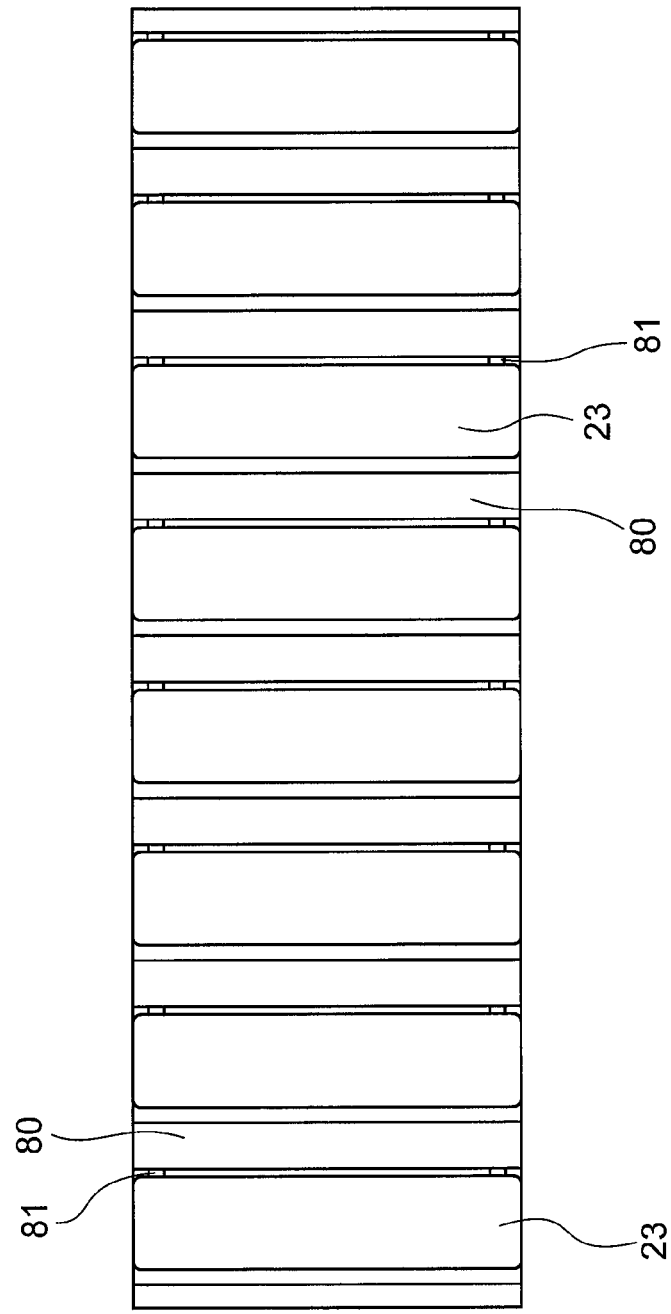
FIG. 14 is a development view for illustrating a rotor of a permanent magnet motor according to a sixth embodiment of the present invention.

FIG. 14 is a development view for illustrating the rotor 34 of the motor 6 according to a sixth embodiment of the present invention.

In this embodiment, each of the projection 74 has a flat side surface in the circumferential direction, which extends in the axial line direction on a side opposite to the second projecting portion 81, and the flat side surface is separated away from the permanent magnet 23 opposed thereto.

The remaining configuration is the same as that of the motor 6 according to the first embodiment.

In the first to fifth embodiments, the effect of reducing the leakage magnetic flux flowing to the first projecting portions 80 is obtained by forming the second projecting portions 81. The second projecting portions 81 are formed for both ends of the permanent magnet 23 at one pole. Therefore, there is an advantage in that the abutment of the permanent magnet 23 is made possible against any of the right and left second projecting portions 81 with a single punch die.

In this embodiment, the second projecting portions 81 are formed on only one side of the projections 74 to be brought into abutment against the permanent magnets 23, whereas the second projecting portions 81 are not formed on another side. In this manner, the leakage magnetic flux flowing to the projections 74 is reduced, and thus the reduction in magnet torque can be further reduced.

Further, even when the rotor core 22 has the same shape for the first rotor portion 78 and the second rotor portion 79, this embodiment can be easily realized for the fourth embodiment by arranging the rotor portions upside down at the time of press-fit over the shaft 19.

Further, this embodiment can be easily realized for the fifth embodiment by arranging the first rotor portion 78 and the second rotor portion 79 without turning upside down at the time of press-fit over the shaft 19.

It is apparent that this embodiment can be realized even for the rotor 34 without a skew between the first rotor portion 78 and the second rotor portion 79.

Seventh Embodiment

FIG. 15 is a development view for illustrating the rotor 34 of the motor 6 according to a seventh embodiment of the present invention.

In this embodiment, cutaway portions 80*a* are formed in abutment portions of the first projecting portions 80 held in abutment against each other in the axial line direction.

The cutaway portions 80*a* may be formed on any one of the abutment portions.

The remaining configuration is the same as that of the motor 6 according to the first embodiment.

In this embodiment, the effect of reducing the leakage magnetic flux in the axial line direction from the permanent magnets 23 to the first projecting portions 80 is provided.

Further, when unmagnetized magnets are magnetized after being bonded to the rotor core 22, magnetization flux becomes the leakage magnetic flux to prevent perfect magnetization of overlapping portions. As a result, the magnet torque is reduced, or vibration noise is generated. In this embodiment, the effect of avoiding the reduction in magnet torque and the generation of vibration noise is provided.

In a case where this embodiment is applied to a combination of the fifth embodiment and the seventh embodiment, even when the second projecting portions 81 are arranged close to skew boundary portions, the positions of the cutaway portions 80*a* of the first projecting portions 80 and the positions of the second projecting portions 81 do not interfere with each other. Therefore, the combination can be easily realized.

On the other hand, in a case where this embodiment is applied to a combination of the sixth embodiment and the seventh embodiment, the leakage magnetic flux can be reduced by setting the height t2 of the second projecting portions 81 smaller than the height t1 of the first projecting portions 80. This embodiment becomes effective means when inclination is desired to be reduced at two points by forming two second projecting portions 81 for each of the permanent magnets 23, and when the length of the permanent magnets 23 in the axial line direction is small or a distance between the second projecting portions 81 is desired to be set as large as possible.

Although the permanent magnet motor to be built in the electric power steering apparatus for a vehicle, which is configured to assist the steering force, is described in each of the embodiments described above, it is apparent that the electric power steering apparatus is merely an example and the permanent magnet motor is applicable to other apparatus.

REFERENCE SIGNS LIST

1 shaft, 2 torque sensor, 3 first connector, 4 ECU, 5 second connector, 6 permanent magnet motor, 7 housing, 8 power supply connector, 9 gear box, 10 tie rod, 11 rack boot, 12 stator core, 13 armature winding, 14 frame, 15 housing, 16 bolt, 17 first bearing, 18 second bearing, 19 shaft, 20 pulley, 21 sensor-use permanent magnet, 22 rotor core, 23, 23A permanent magnet, 24 switching element, 25 heat sink, 26 intermediate member, 27 control board, 28 connection member, 29 case, 30 sensor unit, 31 magnetic sensor, 32 board, 33 supporting member, 34 rotor, 35 concave portion, 36 wall portion, 40 first armature winding, 41 second armature winding, 42 first inverter, 43 second inverter, 44 power source, 45 first power supply relay, 46 second power supply relay, 47 first capacitor, 48 second capacitor, 49 first MOS-FET, 50 second MOS-FET, 51 third MOS-FET, 52 fourth MOS-FET, 53 fifth MOS-FET, 54 sixth MOS-FET, 55 first shunt, 56 second shunt, 57 third shunt, 58 first shunt, 59 second shunt, 60 third shunt, 61 first MOS-FET, 62 second MOS-FET, 63 third MOS-FET, 64 fourth MOS-FET, 65 fifth MOS-FET, 66 sixth MOS-FET, 67 rotation-angle sensor, 67 coil, 70 stator, 71 core back, 72 tooth, 73 slot, 74 projection, 75 gap, 76 hole portion, 77 caulking portion, 78 first rotor portion, 79 second rotor portion, 80 first projecting portion, 80*a* cutaway portion, 81 second projecting portion, 100 electric driving device, 101 bonding surface.

The invention claimed is:

1. A permanent magnet motor, comprising:

a stator comprising an armature winding and a stator core having slots configured to accommodate the armature winding therein; and a rotor, which is provided on an inner side of the stator with a gap therebetween and comprises a rotor core formed by sequentially laminating a plurality of thin steel plates in an axial line direction of the rotor, a plurality of permanent magnets bonded onto a plurality of bonding surfaces formed on a surface of the rotor core at intervals in a circumferential direction of the rotor core, and a shaft passing through the rotor core along a center axis line of the rotor core, the rotor core comprising projections each formed between the bonding surfaces adjacent to each other so as to project in a radial direction of the rotor core therefrom, each of the projections comprising a second projecting portion to be brought into abutment against a side surface of corresponding one of the plurality of permanent magnets in the circumferential direction and a first projecting portion separated away from the side surface of the corresponding one of the plurality of permanent magnets, wherein, when the first projecting portion has a total length L1 in the axial line direction and a height t1 between an extended line from corresponding one of the plurality of bonding surfaces and a parallel line with the extended line, which intersects with a corner portion of the first projecting portion, and when the second projecting portion has a total length L2 in the axial line direction and a height t2 between the extended line and a parallel line with the extended line, which intersects with a corner portion of the second projecting portion, (L1×t1)>(L2×t2) is satisfied, wherein, when a width of the second projecting portion in the circumferential direction is defined as W3, a gap distance between the plurality of permanent magnets and the stator in the radial direction is defined as tg, and a thickness at a center in the circumferential direction of an arc-like outer-circumferential side of each of the plurality of permanent magnets is defined as tm, tg<(2×W3)<tm is satisfied.

2. A permanent magnet motor according to claim 1, wherein each of the projections has a flat side surface in the circumferential direction on a side opposite to the second projecting portion, the flat side surface extending in the axial line direction and being separated away from corresponding one of the plurality of permanent magnets opposed thereto.

3. A permanent magnet motor according to claim 1, wherein the rotor core has a plurality of hole portions formed so as to pass therethrough in the axial line direction at equal intervals around the shaft.

4. A permanent magnet motor according to claim 1, wherein the permanent magnet motor is to be built in an electric power steering apparatus for a vehicle and is configured to assist a steering force.

5. A permanent magnet motor, comprising:
a stator comprising an armature winding and a stator core having slots configured to accommodate the armature winding therein; and
a rotor, which is provided on an inner side of the stator with a gap therebetween and comprises a rotor core formed by sequentially laminating a plurality of thin steel plates in an axial line direction of the rotor, a plurality of permanent magnets bonded onto a plurality of bonding surfaces formed on a surface of the rotor core at intervals in a circumferential direction of the rotor core, and a shaft passing through the rotor core along a center axis line of the rotor core,
the rotor core comprising projections each formed between the bonding surfaces adjacent to each other so as to project in a radial direction of the rotor core therefrom,
each of the projections comprising a second projecting portion to be brought into abutment against a side surface of corresponding one of the plurality of permanent magnets in the circumferential direction and a first projecting portion separated away from the side surface of the corresponding one of the plurality of permanent magnets,
wherein, when the first projecting portion has a total length L1 in the axial line direction and a height t1 between an extended line from corresponding one of the plurality of bonding surfaces and a parallel line with the extended line, which intersects with a corner portion of the first projecting portion, and
when the second projecting portion has a total length L2 in the axial line direction and a height t2 between the extended line and a parallel line with the extended line, which intersects with a corner portion of the second projecting portion,
(L1×t1)>(L2×t2) is satisfied, wherein:
the rotor comprises a plurality of stages of rotor portions arranged along the axial line so as to be skewed in the circumferential direction; and
when a length in the circumferential direction, which is required until the first projecting portions overlap each other through rotation of the plurality of stages of rotor portions adjacent to each other, is defined as W, and
when a width of the second projecting portion in the circumferential direction is defined as W3,
W3<W is satisfied.

6. A permanent magnet motor according to claim 5, wherein each of the plurality of stages of rotor portions adjacent to each other comprises the second projecting portion formed in an orientation of a repulsive force in the circumferential direction between the adjacent permanent magnets having the same polarity.

7. A permanent magnet motor according to claim 5, wherein, for the permanent magnets having the same polarity provided on the plurality of stages of rotor portions adjacent to each other, the second projecting portions are formed on the same side in the circumferential direction.

8. A permanent magnet motor according to claim 5, wherein a cutaway portion is formed in an abutment portion of at least one of the first projecting portions that are held in abutment against each other in the axial line direction.

* * * * *